United States Patent [19]

Wang

[11] Patent Number: 4,573,558

[45] Date of Patent: Mar. 4, 1986

[54] COMPACT SHOCK-ABSORBER FOR TIE-DOWN DEVICES

[75] Inventor: Der-Shi Wang, Mississauga, Canada

[73] Assignee: Allied Corporation, Morris Township, Morris County, N.J.

[21] Appl. No.: 618,008

[22] Filed: Jun. 6, 1984

[51] Int. Cl.[4] .............................................. F16F 7/12
[52] U.S. Cl. ..................................... 188/268; 188/371
[58] Field of Search ............... 24/68 A, 68 F, 68 CD, 24/68 SB; 188/268, 371, 374; 267/69, 148

[56] References Cited

U.S. PATENT DOCUMENTS

| | | | |
|---|---|---|---|
| 1,047,048 | 12/1912 | Harrison . | |
| 1,671,092 | 5/1928 | Richard et al. . | |
| 1,783,102 | 11/1930 | Tucker et al. . | |
| 2,060,032 | 11/1936 | Chalmers . | |
| 3,350,034 | 10/1967 | Madey et al. | 188/268 X |
| 3,596,737 | 8/1971 | Volk | 188/268 |
| 3,694,019 | 9/1972 | Carter | 188/268 X |
| 3,884,450 | 5/1975 | Brammer | 254/164 |
| 3,885,690 | 5/1975 | Van Slambrouck | 214/506 |
| 4,072,257 | 2/1978 | Hall | 224/29 |
| 4,147,113 | 4/1979 | Kilgus et al. | 105/477 |

Primary Examiner—Duane A. Reger
Attorney, Agent, or Firm—James R. Ignatowski; Russel C. Wells

[57] ABSTRACT

A compact shock absorber having a continuous loop of webbing connecting a spool with a spatially separated bracket. The bracket has two spatially separated web shafts captivating the opposite ends of the continuous looped webbing. The central portion of the webbing is looped over the shaft of the spool. The entire assembly is potted with a resilient material to protect the webbing from environmental elements and provide a degree of structural rigidity to the assembly. The high tenacity, high elongation, and excellent elastic recovery of the webbing loop provide the shock absorber with excellent high load shock capabilities.

20 Claims, 7 Drawing Figures

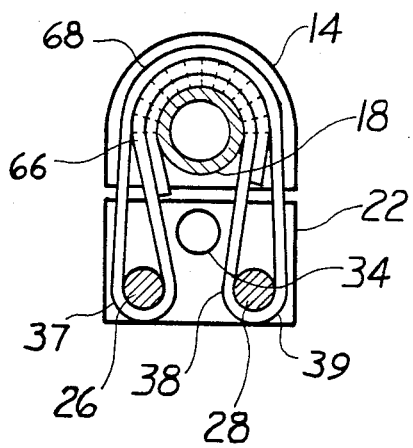
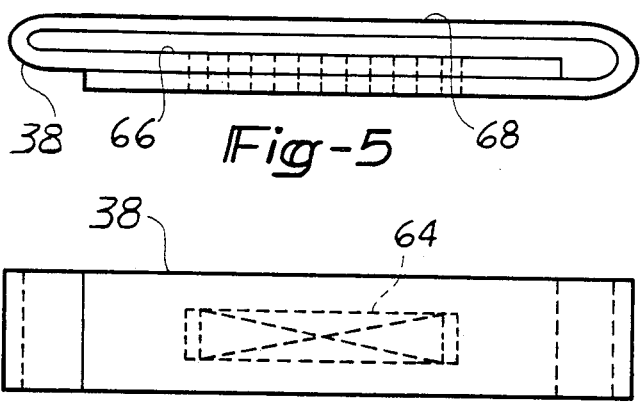
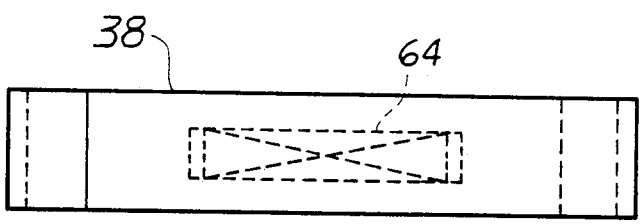
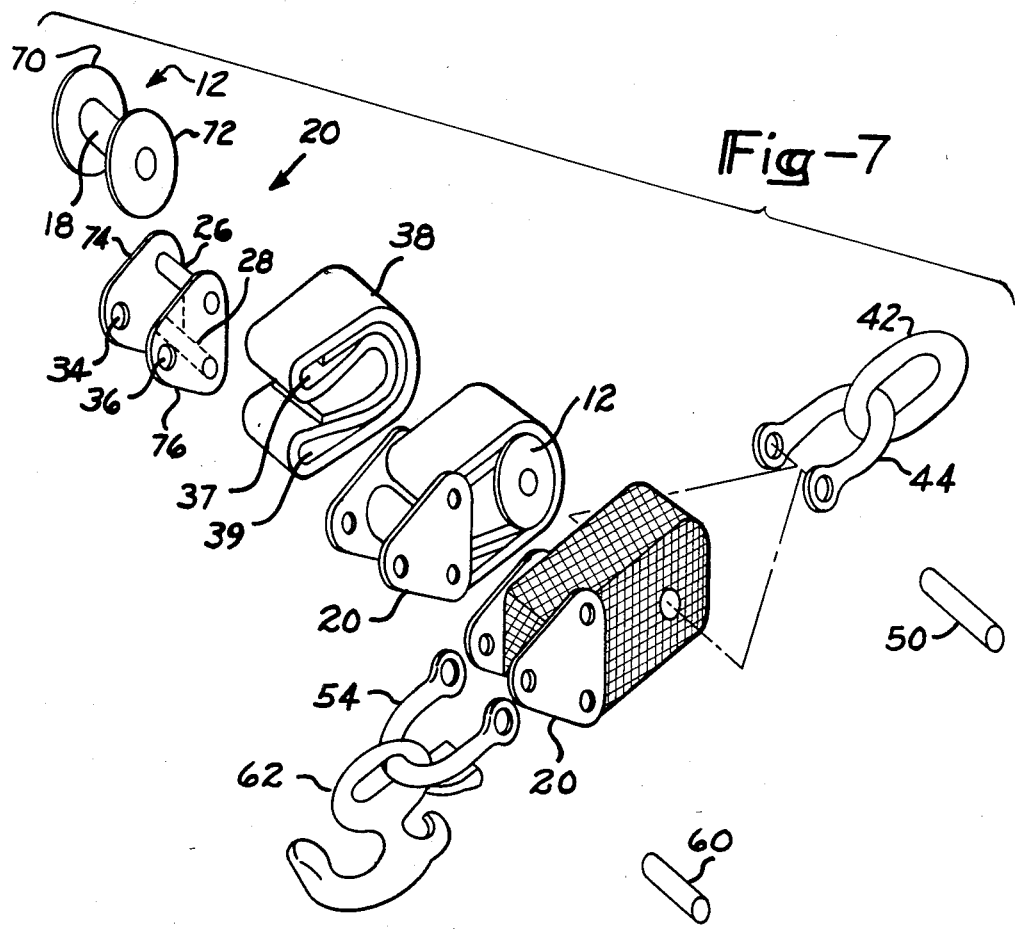

COMPACT SHOCK-ABSORBER FOR TIE-DOWN DEVICES

BACKGROUND OF THE INVENTION

1. Field of the Invention

The invention is related to shock absorbers and in particular to a compact shock absorber having a continuous loop woven web for use in combination with tie-down devices.

2. Prior Art

The transportation of automotive vehicles by rail requires that the vehicle be securely tied down to prevent any displacement which could possibly result in physical damage during transit. Currently the frames of the automotive vehicles are chained down to the railroad car as disclosed by Kilgus in U.S. Pat. No. 4,147,113. This type of tie-down is relatively rigid requiring the vehicle's shock absorbers to take up all of the pounding during transport. As a result, it is estimated that half of the service life of the shock absorbers is consumed during an average 1000 mile journey after leaving the assembly plant. Further the undersides of the vehicle where the tie-down chains are connected have to be strengthened significantly to be able to withstand the high forces generated during railway transportation. This increases the cost of the vehicle and decreases fuel efficiency due to the added weight. Finally the rigid chain tie-down devices currently used experience a great deal of wear requiring periodic replacement to assure their reliability.

Woven webbing similar to that used in automotive safety seat belts has been used as a tie-down for a number of various applications. For example, Van Slambrook in U.S. Pat. No. 3,885,690 discloses the use of such a webbing to support the rear end of a snowmobile on a trailer. In a similar manner Hall in U.S. Pat. No. 4,072,257 discloses the use of a woven strap to secure the load on a platform attached to the rear of a van, and Brammer in U.S. Pat. No. 3,884,450 also discloses the use of such woven straps for tying down mobile homes, trailers and other such vehicles to prevent them from being blown over or capsized by strong winds.

The invention is a shock absorber for the chain type vehicle tie-downs having a continuous loop of woven webbing, encased in rubber. This shock absorber greatly reduces the wear on the vehicle's shock absorbers and the wear on the components of the chain type tie-downs.

SUMMARY OF THE INVENTION

The invention is a shock absorber for a tie-down apparatus comprising a spool having a first pair of side plates connected by a spool shaft, a bracket spatially separated from said spool having a second pair of side plates connected by a pair of spatially separated web shafts, a continuous loop of webbing having its opposite ends captivated by said spatially separated web shafts and a central portion looped over said spool shaft, and means for independently connecting said spool and bracket between a tie-down apparatus and the vehicle.

In the preferred embodiment, the shock absorber is potted in a resilient material to protect the webbing from environmental elements and to add a degree of rigidity between the spool and bracket.

One advantage of the shock absorber is that the high tenacity, ultra-high elongation and excellent elastic recovery of the continuous webbing loop gives it superior high load shock absorbing capabilities. Another advantage is that its robust design gives the shock absorber a very long service life.

These and other advantages will become apparent from a reading of the detailed description of the invention in conjunction with the attached drawings.

BRIEF DESCRIPTION OF THE DRAWINGS

FIG. 4 is a side view of the shock absorber with end plates 16 and 24 removed to show the webbing arrangement.

FIGS. 5 and 6 are respective side and end views of the webbing.

FIG. 7 is an exploded assembly of an alternate embodiment of the shock absorber.

DETAILED DESCRIPTION OF THE INVENTION

Figure 1:
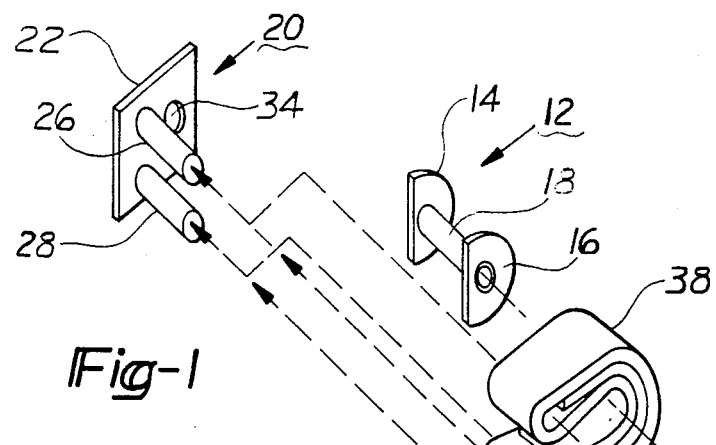
FIG. 1 is an exploded assembly showing the individual elements of the shock absorber.

FIG. 1 is an exploded assembly view of the compact shock absorber 10. The shock absorber 10 comprises a guide spool 12 having two half moon side plates 14 and 16 connected by a spool shaft 18 having an axial bore 52, a guide bracket 20 having two rectangular side plates 22 and 24 connected by a pair of spatially separated web shafts 26 and 28, and a continuous loop of webbing 38 having its opposite ends captivated by the web shafts 26 and 28 and its center section looped over the spool shaft 18.

Figure 2:
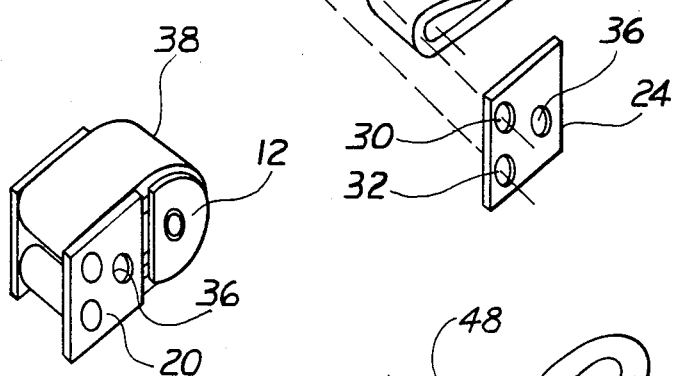
FIG. 2 is a perspective of the assembled shock absorber prior to potting.
Figure 3:
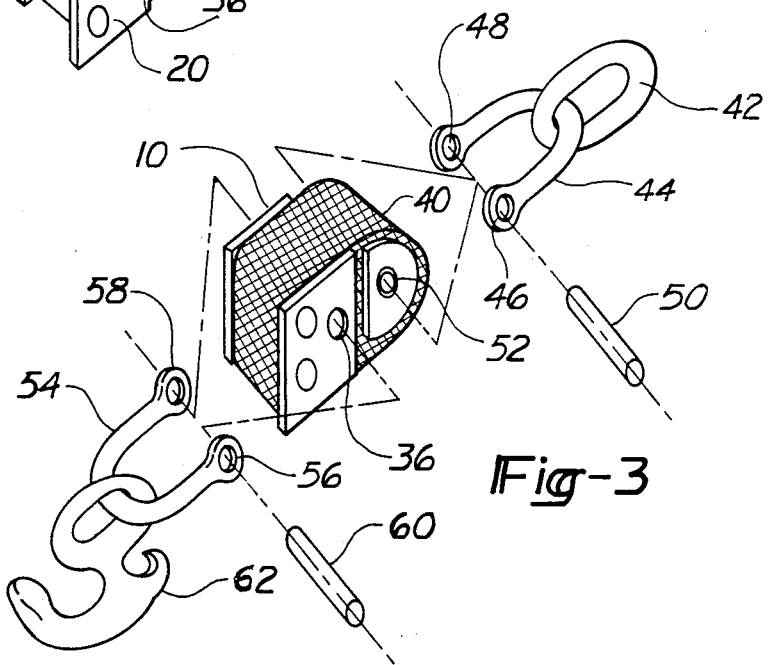
FIG. 3 is a perspective view of the completed shock absorber and the connection elements of a tie-down apparatus.

In assembly the webbing 38 is looped over the spool shaft 18 of the spool guide 12 as shown in FIG. 4 with the two end loops 37 and 39 extending generally parallel to each other. The two end loops 37 and 39 are then inserted over the web shafts 26 and 28 which are fixedly attached to side plate 22 of the guide bracket 20. The other side bracket 24 of the guide bracket having two apertures 30 and 32 adapted to receive the ends of web shafts 26 and 28 is then pressed onto the ends of shafts 26 and 28 locking the webbing between side plates 22 and 24 as shown in FIG. 2. The assembly of the shock absorber 10 is completed by potting the volume between the side plates 14 and 16 of spool 12 and the guide plates 22 and 24 of guide bracket 20 with a resilient material 40 such as Neoprene Rubber manufactured by Clark Roller & Rubber Ltd. of Canada as shown in FIG. 3. The resilient material 40 protects the webbing 38 from the environment and adds a degree of rigidity to the completed shock absorber assembly. The side plates 22 and 24 also have a pair of anchor pin apertures 34 and 36 for receiving an anchor pin as shall be explained hereinafter.

Referring now to FIG. 3, one end of shock absorber 10 may be connected to a tie-down chain 42 by means of a first "U" link 44 having a pair of eyelets 46 and 48 provided at each end of the legs thereof. An anchor pin 50 inserted through the eyelets 44 and 46 and the axial bore 52 formed through the shaft 18 of spool 12 pivotally locks the "U" link 44 and tie-down chain 42 to one end of the shock absorber 10. The other end of the shock absorber 10 may be connected to a hook 62 attached to a second "U" link 54 having two eyelets 56 and 58 provided at the ends of its two legs. An anchor pin 60 inserted through eyelets 56 and 58 of the link 54 and anchor pin apertures 34 and 36 of the guide bracket 20 pivotally locks the second "U" link 54 and hook 62 to the other end of the shock absorber 10. As is known in the art, the hook 62 may be disposed at either end of the shock absorber 10 or the hook 62 may be replaced by a second chain 42 if desired for a particular application.

Referring now to FIGS. 5 and 6, the webbing 38 is made from a length of high tenacity, high elongation, resilient woven material similar to that used for making seat belts for aircraft or automotive vehicles. The opposite ends of the webbing 38 are overlapped and sewn together to form an endless loop using a stitched pattern 64 determined to provide the desired strength with the required elongation characteristic.

The webbing 38 is looped around the spool 12 with the overlapped sewn portion 66 adjacent to the spool shaft 18 as shown in FIG. 4. This arrangement eliminates the problems associated with differences in elongation between the single thickness outer portion and the double thickness sewn portion adjacent to the hollow webbing cylinder 16. Further the compressive force, induced by the outer layer 68 of the webbing 38 pressing the overlapped portion 66 of the webbing against web cylinder 16 decreases the forces tending to separate the sewn ends of the webbing.

The two loops 37 and 39 at the opposite ends of the webbing 38 captivate the spatially separated web shafts 26 and 28 respectively. Side plate 24, pressed onto the ends of web shafts 26 and 28 locks webbing 38 on the guide bracket 20. The webbing 38 looped over the spool shaft 18 loosely couples the spool 12 to the guide bracket 20. The completed assembly is then potted with a resilient material 40 as previously indicated to provide a degree of structural rigidity between the guide bracket 20 and the spool 12.

An alternate embodiment of the shock absorber is illustrated in FIG. 7. In this embodiment, the end pieces 70 and 72 of the guide spool 12 have a circular configuration and the end pieces 74 and 76 of the guide bracket 20 are reversed with respect to the orientation shown in FIGS. 1 and 2 so that the anchor pin apertures 34 and 36 are external to the rubber potted portion of the shock absorber. The webbing 38 is folded around the spool shaft 18 of the guide spool 12 with the looped ends 37 and 39 captivating web shafts 26 and 28 as previously described. As in the embodiment shown in FIG. 3, the webbing is potted with a resilient material to protect the webbing 38 from the environment and provide a degree of structural rigidity to shock absorber assembly. "U" links 44 and 54 and anchor pins 50 and 60 may be used to connect a tie-down chain 42 and/or hook 62 to the shock absorber 10 as previously described.

It is appreciated that one skilled in the art may make changes to the embodiments of the shock absorber described herein and shown on the attached drawings without departing from the spirit of the invention as set forth in the claims.

I claim:
1. A shock absorber comprising:
 a guide spool having two side plates connected by a spool shaft having an axial bore;
 a guide bracket displaced from said guide spool having two side plates connected by a pair of spatially separated web shafts, each of said side plates having an anchor pin aperture axially aligned with each other; and
 a continuous loop of webbing having its opposite end captivated by said spatially separated web shafts and its central portion looped over said spool shaft.

2. The shock absorber of claim 1 having a resilient potting material disposed in the volume defined by said guide spool and guide bracket and coating the exposed surfaces of said webbing.

3. The shock absorber of claim 2 wherein said anchor pin apertures are centrally disposed through the side plates of said guide bracket intermediate said spool shaft and said web shafts.

4. The shock absorber of claim 2 wherein said anchor pin apertures are centrally disposed through the side plates of said guide bracket on the side of said two spatially separated web shafts opposite said spool shaft.

5. The shock absorber of claim 1 wherein said continuous loop of webbing is a predetermined length of webbing folded such that its opposite ends overlap in an overlapped region and said opposite ends are connected to each other by a stitched pattern.

6. The shock absorber of claim 5 wherein said webbing is looped over said spool shaft with said overlapped region adjacent to said spool shaft.

7. The shock absorber of claim 1 further comprising at least a first "U" link straddling said guide spool and having a pair of eyelets coaxial with the bore of said spool shaft; and
 an anchor pin disposed through said eyelets and the bore of said spool shaft pivotally connecting said first "U" link to said guide spool.

8. The shock absorber of claim 7 further comprising:
 a second "U" link straddling said guide bracket and having a pair of eyelets coaxial with said anchor pin apertures; and
 a second anchor pin disposed through the eyelets of said second "U" link and said anchor pin apertures pivotally connecting said second "U" link to said guide bracket.

9. A shock absorber for a tie-down apparatus comprising:
 a spool having a spool shaft;
 a bracket physically separated from said spool, said bracket having two spatially separated shafts; and
 a continuous loop webbing having a central portion looped over said spool shaft to form two end loops, one on either side of said spool shaft, each of said end loops captivated by one of said spatially separated shafts to restrain the displacement of said spool from said bracket.

10. The shock absorber of claim 9 wherein said spool, bracket, and webbing are encased with a resilient potting material to add a degree of structural rigidity to said shock absorber and protect said webbing from environmental elements.

11. The shock absorber of claim 9 wherein said spool and said bracket each include means for connecting to the tie-down apparatus.

12. The shock absorber of claim 11 wherein said means for connecting the tie-down apparatus to said spool is an axial bore provided in said spool shaft.

13. The shock absorber of claim 11 wherein said bracket has two side plates connected by said pair of spatially separated shafts, said means for connecting the tie-down apparatus to said bracket is a pair of anchor pin apertures axially disposed along a line parallel to said spatially separated shafts, one of said anchor apertures is provided through each of said side plates.

14. The shock absorber of claim 13 wherein said anchor apertures are disposed intermediate said pair of spatially separated shafts and said spool shaft.

15. The shock absorber of claim 9 wherein said continuous loop of webbing is a predetermined length of webbing folded such that the opposite ends of said length of webbing overlap in an overlapped region and said opposite ends are connected to each other by a stitched pattern.

16. The shock absorber of claim 15 wherein said webbing is looped over said spool shaft with said overlapped region adjacent to the surface of said spool shaft.

17. A shock absorber comprising:
- a spool having a pair of side plates connected by a spool shaft having an axial bore therethrough;
- a bracket having a pair of side plates connected by a pair of spatially separated web shafts, said side plates each having an anchor aperture provided therethrough along an axis parallel to said web shafts;
- a continuous loop of webbing having a pair of opposite ends and a central portion, each of said opposite ends captivated by one of said web shafts and the central portion of said webbing looped over said spool shaft; and
- a resilient potting material encasing said webbing and the volume defined by said spool and said bracket to protect said webbing from the environmental elements and to provide a degree of structural rigidity between said spool and bracket.

18. The shock absorber of claim 17 wherein said continuous loop of webbing is a predetermined length of webbing folded so that its opposite ends overlap in said central portion and said opposite ends are connected by a stitched pattern.

19. The shock absorber of claim 18 wherein said webbing is looped over said spool shaft with said overlapped ends adjacent to the surface of said spool shaft.

20. The shock absorber of claim 17 further including:
- a first "U" link straddling said spool having a pair of eyelets coincident with the axial bore of said spool shaft;
- a first anchor pin inserted through said eyelets and said axial bore pivotally linking said first "U" link to said spool;
- a second "U" link straddling said bracket having a pair of eyelets coincident with said anchor pin apertures; and
- a second anchor pin inserted through said eyelets and said anchor apertures pivotally linking said second "U" link to said bracket.

* * * * *